(12) United States Patent
Ogawa

(10) Patent No.: US 9,659,363 B2
(45) Date of Patent: May 23, 2017

(54) WORKPIECE POSITIONING APPARATUS USING IMAGING UNIT

(71) Applicant: FANUC Corporation, Yamanashi (JP)

(72) Inventor: Kenichi Ogawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/017,800

(22) Filed: Feb. 8, 2016

(65) Prior Publication Data

US 2016/0239949 A1    Aug. 18, 2016

(30) Foreign Application Priority Data

Feb. 12, 2015   (JP) ................................. 2015-025488

(51) Int. Cl.
| | | |
|---|---|---|
| G06T 7/00 | (2006.01) | |
| G06K 9/62 | (2006.01) | |
| H04N 7/18 | (2006.01) | |
| G06T 7/73 | (2017.01) | |
| B21D 43/00 | (2006.01) | |
| G01B 11/00 | (2006.01) | |
| G06T 7/564 | (2017.01) | |

(52) U.S. Cl.
CPC ............ *G06T 7/001* (2013.01); *G06K 9/6204* (2013.01); *G06T 7/74* (2017.01); *B21D 43/003* (2013.01); *G01B 11/002* (2013.01); *G06T 7/564* (2017.01); *G06T 2207/30164* (2013.01)

(58) Field of Classification Search
CPC ........ G06K 9/6204; G06T 2207/30164; G06T 7/001; G06T 7/0044; G06T 7/564; Y10S 901/46; B21D 43/003; G01B 11/002
See application file for complete search history.

(56) References Cited

U.S. PATENT DOCUMENTS

| | | | | |
|---|---|---|---|---|
| 2009/0018699 A1* | 1/2009 | Akami | ................ | B21D 43/003 700/259 |
| 2009/0204272 A1 | 8/2009 | Yuzawa | | |
| 2014/0009582 A1* | 1/2014 | Suzuki | ................ | G06T 7/0022 348/46 |

FOREIGN PATENT DOCUMENTS

| | | |
|---|---|---|
| JP | 60-113858 U | 8/1985 |
| JP | 6-312347 A | 11/1994 |
| JP | H07-004737 B2 | 1/1995 |
| JP | 2010-58239 A | 3/2010 |
| JP | 4840144 B2 | 12/2011 |

* cited by examiner

*Primary Examiner* — Khoi Tran
*Assistant Examiner* — Robert Nguyen
(74) *Attorney, Agent, or Firm* — Hauptman Ham, LLP

(57) ABSTRACT

A positioning apparatus includes: a calculation unit that calculates an amount of deviation between a position of a feature point of a reference workpiece and a feature point of a workpiece by comparing a relative position of an imaging unit with respect to a table when the workpiece is imaged by the imaging unit with a reference relative position, and comparing a position of a feature point of the workpiece in the image of the workpiece imaged by the imaging unit with a reference point image position; and a program changing unit that generates a correction amount such that the amount of deviation calculated by the calculation unit becomes zero, and thereby changes a program of the machine tool.

1 Claim, 3 Drawing Sheets

WORKPIECE POSITIONING APPARATUS USING IMAGING UNIT

RELATED APPLICATIONS

The present application claims priority to Japanese Application Number 2015-025488, filed Feb. 12, 2015, the disclosure of which is hereby incorporated by reference herein in its entirety.

BACKGROUND OF THE INVENTION

1. Field of the Invention

The present invention relates to a workpiece positioning apparatus for a machine tool using an imaging unit such, for example, as vision sensor.

2. Description of the Related Art

In some cases, a workpiece is formed with two feature points for example, such as holes, bosses, notches or the like for positioning or phase-matching. Such feature points are engaged with a pin, spigot joint, or butt provided on the table of the machine tool to achieve positioning and phase-matching of the workpiece. In Japanese Examined Patent Publication No. 07-004737, a reference hole is formed in a workpiece as a feature point. An imaging unit, e.g., a camera images the reference hole of the workpiece through a hole formed through a table.

In order to achieve more accurate positioning or the like, a touch probe is used which is mounted on a spindle of a machine tool. Preferably, the workpiece is positioned and phase-matched using together an electric contact sensing technique by the touch probe and the above-described technique using the feature point. Further, in Japanese Patent No. 4,840,144 Specification, a device is disclosed which is configured to non-contact measure a distance between a workpiece and a sensor.

SUMMARY OF THE INVENTION

However, in Japanese Examined Patent Publication No. 07-004737, it is necessary to have the center of the hole of the table positioned in front of the imaging unit when the table is returned to the origin during imaging. In other words, in Japanese Examined Patent Publication No. 07-004737, the relative position between the table and the imaging unit during imaging is a fixed positional relationship at all times.

Further, in Japanese Patent No. 4,840,144 Specification, the sensor and the workpiece are relatively moved. When the workpiece enters a length measuring area within a predetermined range, a detection signal of the sensor is outputted. Thus, when a burr or the like exists in the outer profile of the workpiece, for example, there is a possibility that an error detection may occur. Further, when a feature point is printed on the workpiece, it is not possible to detect such a feature point. Moreover, an overshoot occurs to detect the workpiece, and a lot of time is needed due to the extra moving distance.

The present invention has been made in view of such circumstances, and has for an object to provide a positioning apparatus that is capable of positioning a workpiece easily and in a short time.

In order to achieve the foregoing object, according to a first aspect of the present invention, there is provided a positioning apparatus including: an imaging unit that images from above a workpiece fixed to a table of a machine tool; a moving unit that causes the imaging unit to be positioned at a desired relative position with respect to the table in a plane parallel with the table; an image processing unit that processes the image of the workpiece imaged by the imaging unit and detects a position of a feature point of the workpiece in the image; a storage unit that stores, as a reference relative position, a relative position of the imaging unit with respect to the table when a reference workpiece is imaged by the imaging unit, and stores, as a reference point image position, a position of a feature point of the reference workpiece in the image of the reference workpiece imaged by the imaging unit; a calculation unit that calculates an amount of deviation between the position of the feature point of the reference workpiece and the feature point of the workpiece by comparing the relative position of the imaging unit with respect to the table when the workpiece is imaged by imaging unit with the reference relative position, and comparing the position of the feature point of the workpiece in the image of the workpiece imaged by the imaging unit with the reference point image position; and a program changing unit that generates an amount of correction such that the amount of deviation calculated by the calculation unit becomes zero, and thereby changes a program of the machine tool.

According to a second aspect of the present invention, in the first aspect of the present invention, the workpiece and the reference workpiece include at least two feature points, and the amount of deviation calculated by the calculation unit includes an amount of rotation deviation in a plane parallel with the table by comparing a direction of a line segment combining the two feature points in the image of the reference workpiece and a direction of a line segment combining the corresponding two feature points in the image of the workpiece.

These objects, features, and advantages, as well as other objects, features, and advantages, of the present invention will become more clear from a detailed description of exemplary embodiments of the present invention illustrated in the accompanying drawings.

DETAILED DESCRIPTION

Figure 1:
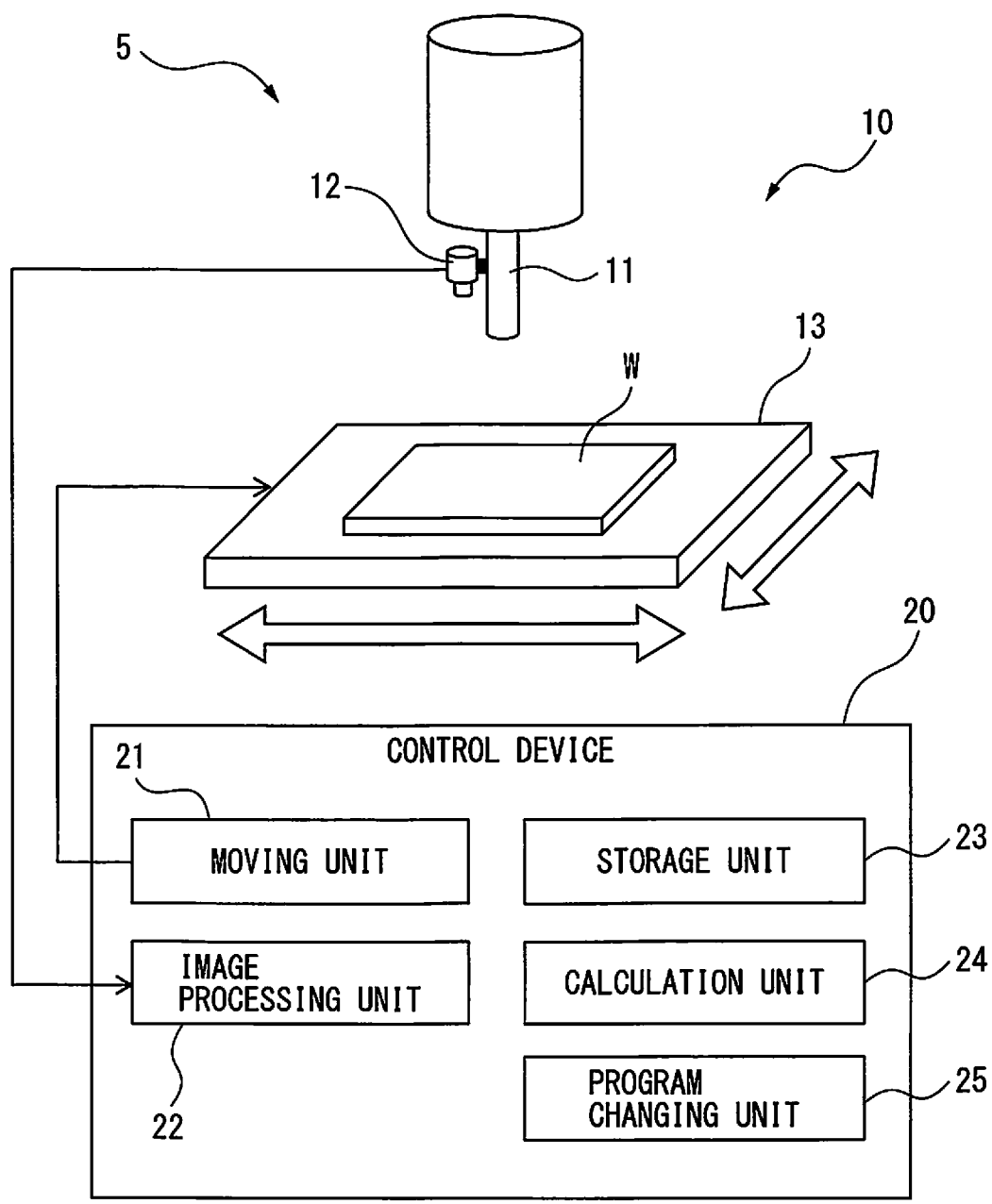
FIG. 1 is a schematic view of a positioning apparatus based on the present invention.

Embodiments of the present invention will be described with reference to the accompanying drawings hereinbelow. In the drawings, like members are denoted by like reference numerals. In order to facilitate understanding, the scale of the drawings is changed arbitrarily.

FIG. 1 is a schematic view of a positioning apparatus based on the present invention. As illustrated in FIG. 1, a tool (not shown) mounted on a spindle 11 of a machine tool 5 is configured to machine a workpiece W fixed on a table 13. The spindle 11 of the machine tool 5 is capable of reciprocation in a vertical direction (e.g., Z direction) as well as rotation. The positioning apparatus 10 of the present invention mainly includes the machine tool 5, and a control device 20 that controls the machine tool 5.

As illustrated in FIG. 1, an imaging unit 12, e.g., a camera is fixed to the spindle 11. Thus, the positional relationship between the imaging unit 12 and the spindle 11 is fixed.

Preferably, the optical axis of the imaging unit 12 is parallel with the spindle 11, and the field of view of the imaging unit 12 covers the workpiece W in entirety.

The workpiece W is a planar workpiece, a curved workpiece, or an uneven workpiece, for example, and includes at least two feature points. The feature point is a hole, a boss, a notch or the like, for example. Alternatively, the feature point of the workpiece W may be a pattern, a character or the like printed on the workpiece. In other words, the feature point of the workpiece W in the present invention may be a part of the upper surface of the workpiece W which is flat and cannot be detected by a contact type sensor.

The table 13 is connected to a moving unit 21 of the control device 20. The moving unit 21 causes the table 13 to be moved in two directions, e.g., X direction and Y direction, which are orthogonal to each other in a plane parallel with the tabletop of the table 13. Since the spindle 11 of the machine tool 5 is immobile in the X direction and the Y direction, the moving unit 21 is capable of causing the spindle 11 and the imaging unit 12 to be positioned at a desired relative position with respect to the table 13 in a plane that is parallel with the table 13.

The control device 20 includes: an image processing unit 22 that processes an image of the workpiece imaged by the imaging unit 12 and detects a position of a feature point of the workpiece in the image; and a storage unit 23 that stores, as a reference relative position, a relative position of the imaging unit 12 with respect to the table 13 when a reference workpiece W0 is imaged by the imaging unit 12, and also stores, as a reference point image position, a position of a feature point of the reference workpiece in the image of the reference workpiece W0 imaged by the imaging unit 12.

Further, the control device 20 includes a calculation unit 24 that calculates an amount of deviation between the position of the feature point of the reference workpiece W0 and the feature point of the workpiece W by comparing the relative position of the imaging unit 12 with respect to the table 13 when the workpiece W is imaged by the imaging unit 12 with the reference relative position and comparing the position of the feature point of the workpiece W in the image of the workpiece W imaged by the imaging unit 12 with reference point image position. Further, the control device 20 includes a program changing unit 25 that changes the program of the machine tool 5 by generating an amount of correction such that the amount of deviation calculated by the calculation unit 24 becomes zero.

Figure 2:
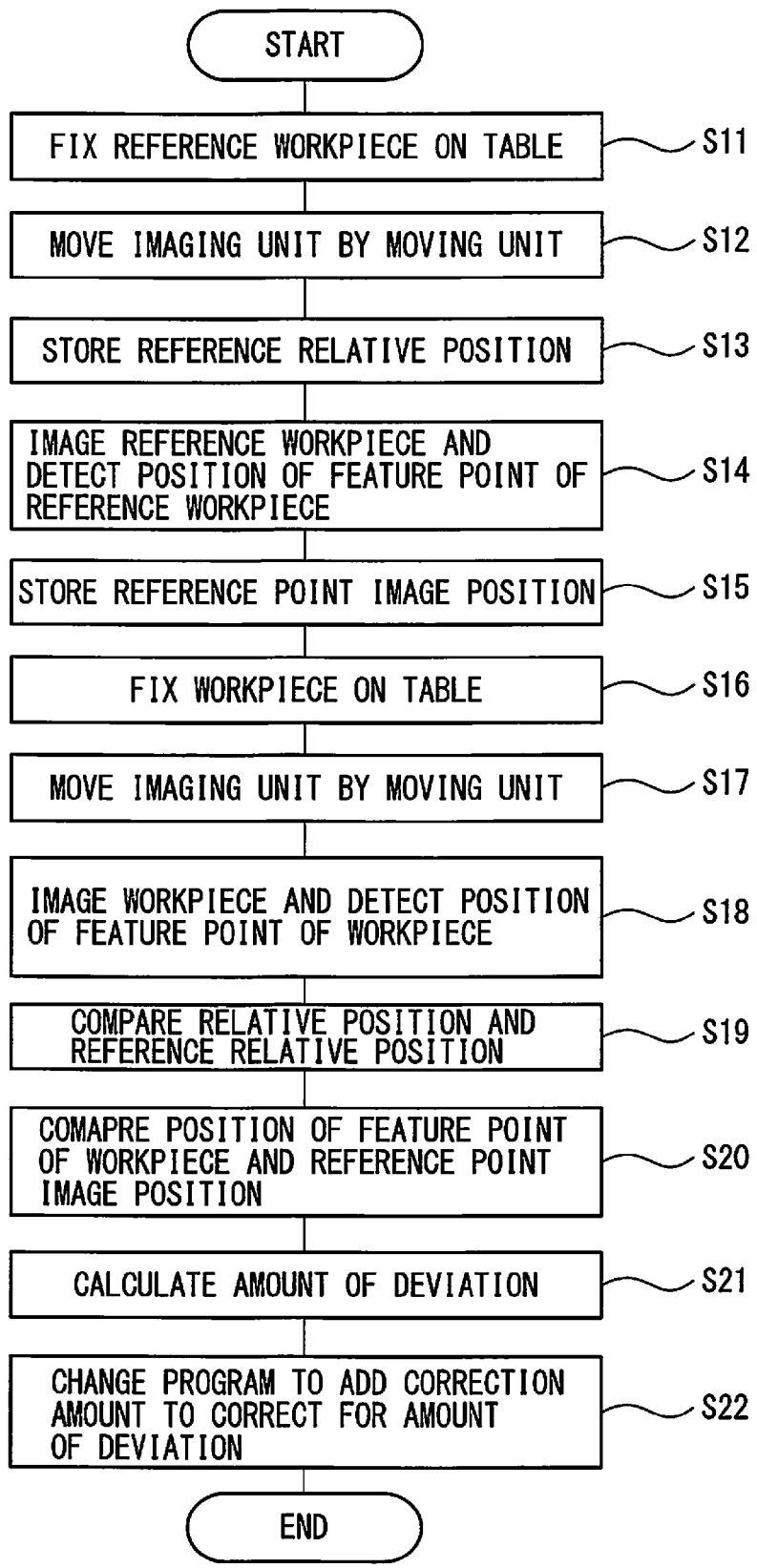
FIG. 2 is a flow chart illustrating the operation of the positioning apparatus illustrated in FIG. 1.

FIG. 2 is a flow chart illustrating the operation of the positioning apparatus illustrated in FIG. 1. Referring to FIGS. 1 and 2, description will be made of the operation of the positioning apparatus according to the present invention hereinbelow. First, at step S11, the reference workpiece W0 is fixed on the table 13. The reference workpiece W0 has a size similar to that of the workpiece W and likewise includes at least two feature points. Further, let it be assumed that the reference workpiece W0 and the workpiece W are fixed to the table 13 by a suitable fixing jig or the like.

Then, at step S12, the imaging unit 12 is relatively moved by the moving unit 21 to a desired position with respect to the table 13. The desired position refers to a relative position between the table 13 and the imaging unit 12 where a feature point can be satisfactorily imaged when the reference workpiece W0 and the below-described workpiece W are imaged. Then, the storage unit 23 stores, as the reference relative position, the position of the reference workpiece W0 after the imaging unit is moved (step S13).

Thereafter, at step S14, the imaging unit 12 images the reference workpiece W0. The image processing unit 22 processes the imaged image and detects the position of a feature point of the reference workpiece W0 in the image. The storage unit 23 stores, as the reference point image position, the position of the feature point of the reference workpiece W0 in the image (step S15). The processing up to steps S11 to S15 is a pre-processing for determining the reference relative position and the reference point image position. When such pre-processing is performed beforehand and the reference relative position and the reference point image position are stored in the storage unit 23, the processing at steps S11 to S15 may be omitted.

Then, at step S16, the reference workpiece W0 is removed, and the workpiece W is fixed on the table 13. Then, at step S17, the imaging unit 12 is relatively moved to the above desired position with respect to the table 13 by the moving unit 21. The relative position of the workpiece W with respect to the table after the imaging unit is moved may be stored in the storage unit 23.

At step S18, the imaging unit 12 images the workpiece, and the image processing unit 22 processes the imaged image and detects the positions of the feature points of the workpiece W in the image. The positions of the feature points may be stored in the storage unit 23.

Then, at step S19, the calculation unit 24 compares the relative position of the workpiece W and the reference relative position of the reference workpiece W0. At step S20, the calculation unit 24 compares the position of the feature point in the image of the workpiece W and the reference point image position in the image of the reference workpiece W0. Further, the calculation unit 24 calculates, using the result of the comparison, the amount of deviation between the position of the feature point of the reference workpiece W0 and the feature point of the workpiece W (step S21).

Figure 3:
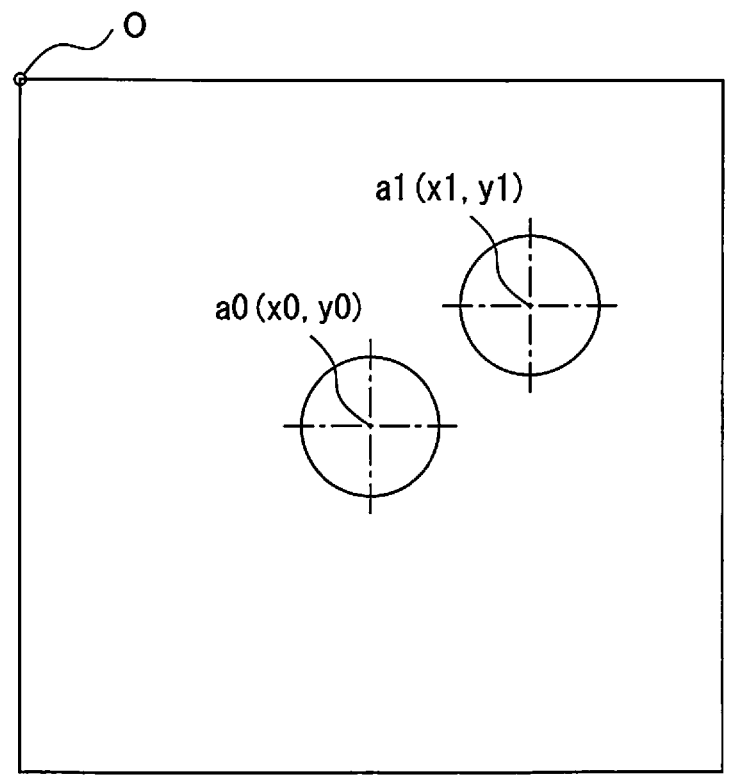
FIG. 3 is an enlarged view of a table and a workpiece.

FIG. 3 is an enlarged view of the table and the workpiece. In FIG. 3, there are illustrated, the reference origin O of the table 13, the reference point image position a0 (x0, y0) of the reference W0, and the position a1 (x1, y1) of the corresponding feature point of the workpiece W. In such an instance, the amount of deviation a1−a0 is calculated as (x1−x0, y1−y0).

Naturally, a similar amount of deviation may be calculated with respect to the other feature point as well. Then, at step S22, the program changing unit 25 generates an amount of correction for correcting the amount of deviation, and changes the program of the machine tool 5 so as to add the amount of correction to the program.

In this manner, in the present invention, the program is changed to correct the amount of deviation instead of precisely positioning the workpiece. Thus, there is no need to precisely position the workpiece, so that as a result it is possible to position the workpiece in a short time. Further, as will be appreciated from the above description, in the present invention, it is not necessary that during imaging, the relative position between the table 13 and the imaging unit 12 be a fixed relationship at all times; thus, it is possible to easily position the workpiece.

When the feature point is a hole, boss, notch or the like, it is necessary for the imaging unit 12 to be positioned substantially right above the feature point in order to acquire a satisfactory image. In this regard, in the present invention, the imaging unit 12 is relatively moved to a desired position where the feature point can be imaged satisfactorily. Thus, in the present invention, it is not necessary that the feature point be a hole, boss, notch or the like, and it is possible to accurately determine the position of the feature point even when the feature point is a pattern, character or the like printed on the workpiece W, for example. Therefore, a case may occur in which there is no need to additionally form a feature point on the workpiece W. Further, even when there is need to form a feature point such as a hole, boss, notch or the like on the workpiece W, the feature point may be formed at any place of the workpiece W since the imaging unit 12 can be moved. As such, in the present invention, it is not necessary that the relative position between the table and the imaging unit be a fixed relationship at all times, so that the degree of freedom in the position to form the feature point is enhanced according to the present invention.

Figure 4:
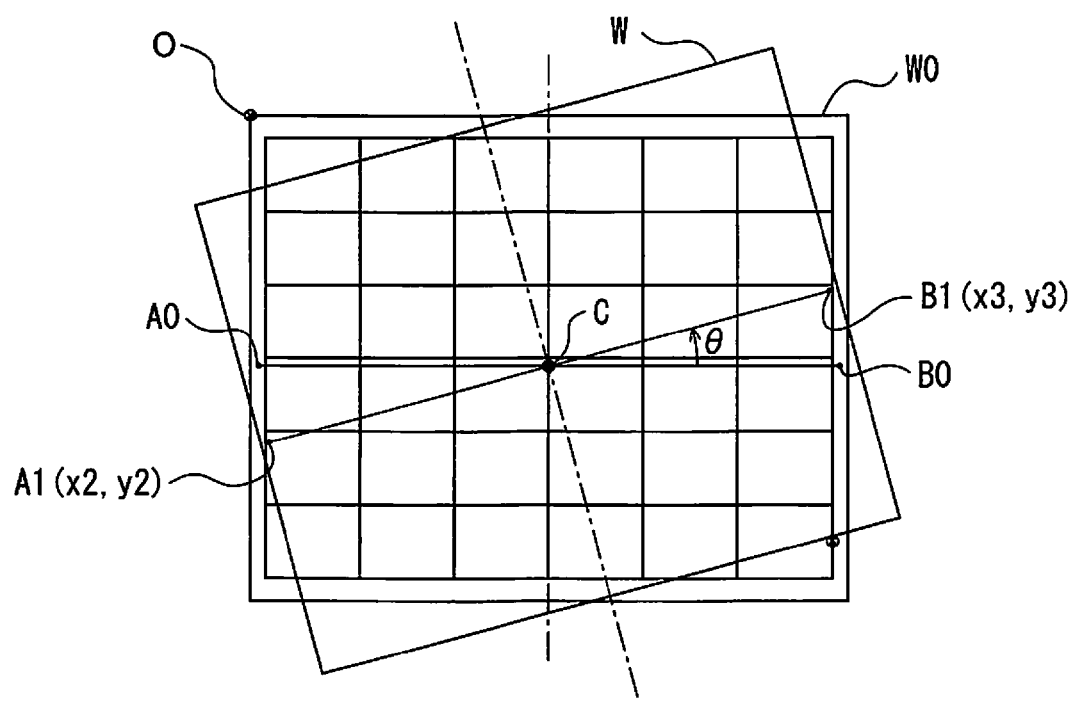
FIG. 4 is an enlarged view of the workpiece and a reference workpiece.

Further, FIG. 4 is an enlarged view of the workpiece and the reference workpiece. As illustrated in FIG. 4, a case may occur in which the workpiece W is rotated in the table 13 with respect to the reference workpiece W0 (rotation deviation). In FIG. 4, the angle of rotation about a rotation center C of the workpiece W with respect to the reference workpiece W0 is represented by θ. In such a case, at least two feature points are used.

In the example illustrated in FIG. 4, at step S18 of FIG. 2, the feature points A1 (x2, y2) and B1 (x3, y3) of the workpiece W in the image are detected with respect to the reference origin 0 of the table 13. The feature points A1 and B1 of the workpiece W correspond to the feature points A0 and B0 of the reference workpiece W0, respectively. As can be seen from FIG. 4, the feature points A0 and B0 correspond to X-coordinates in the image.

The rotation angle θ depicted in FIG. 4 is an angle between the direction of a line segment combining the two future points A0 and B0 in the image of the reference workpiece W0 and the direction of a line segment combining the corresponding two feature points A1 and B1 in the image of the workpiece W. The rotation angle θ is calculated from the following equation (1):

$$\theta = \tan^{-1}\{(y3-y2)/(x3-x2)\} \quad (1)$$

The coordinate (xc, yc) of the rotation center C is calculated from the following equation (2):

$$xc=(x2+x3)/2,\ yc=(y2+y3)/2 \quad (2)$$

The calculation unit 24 calculates an amount of rotation deviation as the rotation angle θ and the coordinate of the rotation center C. Further, the program changing unit 25 calculates a correction amount for the thus calculated rotation angle θ and the rotation center C, and causes the correction amount to be reflected in the program of the machine tool 5 as described above. It will be apparent that an advantage similar to that described above can be obtained in this case as well.

ADVANTAGE OF THE INVENTION

In the first aspect of the invention, since the program is changed to correct for the amount of deviation, there is no need to precisely position the workpiece, and therefore as a result it is possible to position the workpiece in a short period of time. Further, since the imaging unit is relatively moved, the position of the feature point can be determined accurately even when the feature point is a pattern, character of the like printed on the workpiece, and, in addition, the degree of freedom in the position to form the feature point is enhanced.

In the second aspect of the invention, even when the amount of deviation includes an amount of rotation deviation, an advantage similar to that described above can be obtained.

While the present invention has been described using exemplary embodiments thereof, it will be appreciated by those skilled in the art that the foregoing changes, and a variety of other changes, omissions and additions, can be performed without departing from the scope of the invention.

What is claimed is:

1. A positioning apparatus comprising:
   an imaging unit that images from above a workpiece fixed to a table of a machine tool;
   a moving unit that causes the imaging unit to be positioned at a desired relative position with respect to the table in a plane parallel with the table;
   an image processing unit that processes the image of the workpiece imaged by the imaging unit and detects a position of a feature point of the workpiece in the image;
   a storage unit that stores, as a reference relative position, a relative position of the imaging unit with respect to the table when a reference workpiece is imaged by the imaging unit, and stores, as a reference point image position, a position of a feature point of the reference workpiece in the image of the reference workpiece imaged by the imaging unit;
   a calculation unit that calculates an amount of deviation between the position of the feature point of the reference workpiece and the feature point of the workpiece by comparing the relative position of the imaging unit with respect to the table when the workpiece is imaged by imaging unit with the reference relative position, and comparing the position of the feature point of the workpiece in the image of the workpiece imaged by the imaging unit with the reference point image position; and
   a program changing unit that generates an amount of correction such that the amount of deviation calculated by the calculation unit becomes zero, and thereby changes a program of the machine tool;
   wherein the workpiece and the reference workpiece include at least two feature points, and
   wherein the amount of deviation calculated by the calculation unit includes an amount of rotation deviation in a plane parallel with the table by comparing a direction of a line segment combining the two feature points in the image of the reference workpiece and a direction of a line segment combining the corresponding two feature points in the image of the workpiece.

* * * * *